United States Patent [19]

Kasprzyk et al.

[11] Patent Number: 5,287,103
[45] Date of Patent: Feb. 15, 1994

[54] METHOD AND APPARATUS FOR PROVIDING LOCAL AREA NETWORK CLIENTS WITH INTERNETWORK IDENTIFICATION DATA

[75] Inventors: Marlon Z. Kasprzyk, Carol Stream; Paul K. Wolfe, Jr., Naperville, both of Ill.

[73] Assignee: AT&T Bell Laboratories, Murray Hill, N.J.

[21] Appl. No.: 814,129

[22] Filed: Dec. 30, 1991

[51] Int. Cl.⁵ .............................................. H04Q 1/00
[52] U.S. Cl. .............................. 340/825.52; 370/94.1
[58] Field of Search ............... 340/825.52; 370/94.1; 395/200

[56] References Cited

U.S. PATENT DOCUMENTS

| | | | |
|---|---|---|---|
| 4,813,038 | 3/1989 | Lee | 370/94.1 |
| 4,816,826 | 3/1989 | Munter | 340/825.52 |
| 5,163,045 | 11/1992 | Caram | 370/94.1 |
| 5,166,931 | 11/1992 | Riddle | 370/94.1 |
| 5,185,860 | 2/1993 | Wu | 395/200 |

Primary Examiner—Donald J. Yusko
Assistant Examiner—Brian Zimmerman
Attorney, Agent, or Firm—Michael B. Johannesen

[57] ABSTRACT

An arrangement providing an internetwork identification in response to a broadcast message from a LAN client wherein the broadcast message comprises the LAN client's LAN address. The exemplary apparatus comprises a receiver for receiving a message from the LAN and a translator coupled to the receiver for providing a translation of the LAN address to an internetwork identification responsive to determining that the received message is a broadcast message request for internetwork identification. The translator comprises a first device for determining that the received message comprises a broadcast message request for an internetwork identification and a second device coupled to the first device and responsive thereto for receiving the LAN address and providing the internetwork identification. The second device may comprise a disk system or other writable, nonvolatile electronic device.

12 Claims, 6 Drawing Sheets

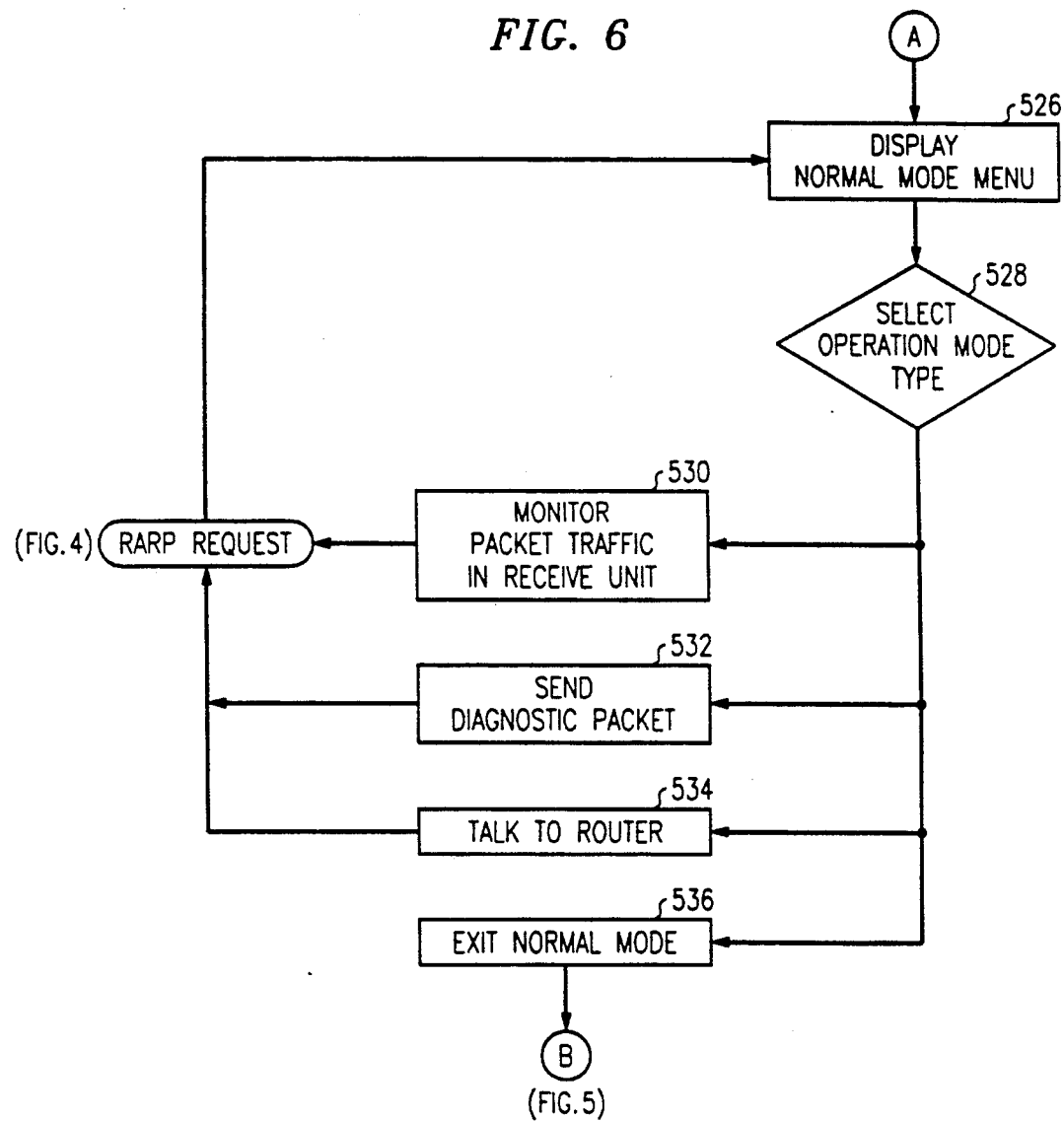

METHOD AND APPARATUS FOR PROVIDING LOCAL AREA NETWORK CLIENTS WITH INTERNETWORK IDENTIFICATION DATA

TECHNICAL FIELD

This invention relates to local area networks (LANs) and, more specifically, to a method and apparatus for providing reverse address resolution in a LAN when a router is used.

BACKGROUND OF THE INVENTION

Local area networks (LANs) are becoming increasing sophisticated, with several layers of protocols serving several purposes in routing and administering traffic on the LAN. Increasingly, routers are being used to connect one or more LANs together and to file servers, printers and other centrally located services. A router may change or translate the protocol of one LAN to the protocol of another as part of its function. By using a router, several diverse LANs may be connected to each other and also share common resources. Routers generally require that, in order to transmit a message from one LAN to another or to the common resources, the message must have an inter-network identification (Internet ID) of the sending or receiving node of the LAN.

One of the characteristics of most routers is that they do not translate and distribute broadcast messages from clients on one LAN to other LANs or to common resources. This design evolved because the distribution of broadcast messages caused severe inter-network congestion that results in blocking of other messages. However, this design causes an important group of LAN clients to be cut off from inter-network communications and central services.

Any LAN client that does not have writable, non-volatile memory is cut off from such inter-network communications and services until properly initialized. If a LAN client has a writable, non-volatile store, such Internet ID information can be stored therein, and will be available following any occasion when the LAN client is taken out of service and its other memory contents destroyed. As stated above, in order to establish inter-network communication, a LAN client must have an Internet ID. However, work stations that do not have a disk system and development or test models in systems laboratories frequently do not have writable, non-volatile memory necessary to store the inter-network identification (Internet ID) necessary to communicate through a router. When such a work station or test system is initially connected to the LAN, or connected to the LAN following being taken out of service with contents of memory cleared or otherwise destroyed, it sends a broadcast message to the file server where Internet IDs are stored, requesting its Internet ID. Since the router does not distribute broadcast messages, the Internet ID request is not delivered to the file server. The solution of providing a file server for each LAN is very expensive and further introduces problems of concurrently updating all of the file servers.

Therefore, a problem in the art is that there is no inexpensive apparatus and method to provide an Internet ID to LAN clients that do not have writable, non-volatile memory.

SUMMARY OF THE INVENTION

This problem is solved and a technical advancement is achieved in the art by a method and apparatus that provides internetwork identification data for LAN clients. Advantageously, this invention receives a broadcast message on a LAN, wherein the message comprises a request for an internetwork identification and the LAN address of the LAN client, translates the LAN address into an internetwork identification, and transmits a message comprising the internetwork identification to the LAN client.

In a method according to the preferred embodiment of this invention, a LAN client sends a broadcast message comprising its LAN address on the LAN requesting an internetwork identification so that it may communicate with clients on other LANs and one or more file servers through a router. A local reverse address resolution protocol server monitors the LAN for such requests. The local reverse address resolution protocol server translates the LAN address from the message into an internetwork identification and transmits a messages comprising the internetwork identification to the LAN client. Advantageously, the translation comprises performing a table look up in an address table where the LAN address is paired with its corresponding internetwork identification. Furthermore, if the LAN address is not in the address table, a diagnostic message is sent to the LAN client.

An apparatus according to the preferred embodiment of this invention provides internetwork identification in response to a broadcast message from a LAN client wherein the broadcast message comprises the LAN client's LAN address. The apparatus comprises a receiver for receiving a message from the LAN and a translator coupled to the receiver for providing a translation of the LAN address to an internetwork identification responsive to determining that the received message is a broadcast message request for internetwork identification. Advantageously, the translator comprises a first device for determining that the received message comprises a broadcast message request for an internetwork identification and a second device coupled to the first device and responsive thereto for receiving the LAN address and providing the internetwork identification. The second device may comprise a disk system or other writable, nonvolatile electronic device. Furthermore, the apparatus may include an interface for a terminal. A device to update the second device is also provided, wherein said updating device comprises a device for sending an update request to a file server and a device responsive to a message from the file server for updating the second device.

BRIEF DESCRIPTION OF THE DRAWING

A more complete understanding of the invention may be obtained from a consideration of the following description in conjunction with the drawings in which

FIGS. 3-6 are flow charts for a RARP server according to FIG. 2 describing the program control of the preferred embodiment of this invention.

DETAILED DESCRIPTION

Figure 1:
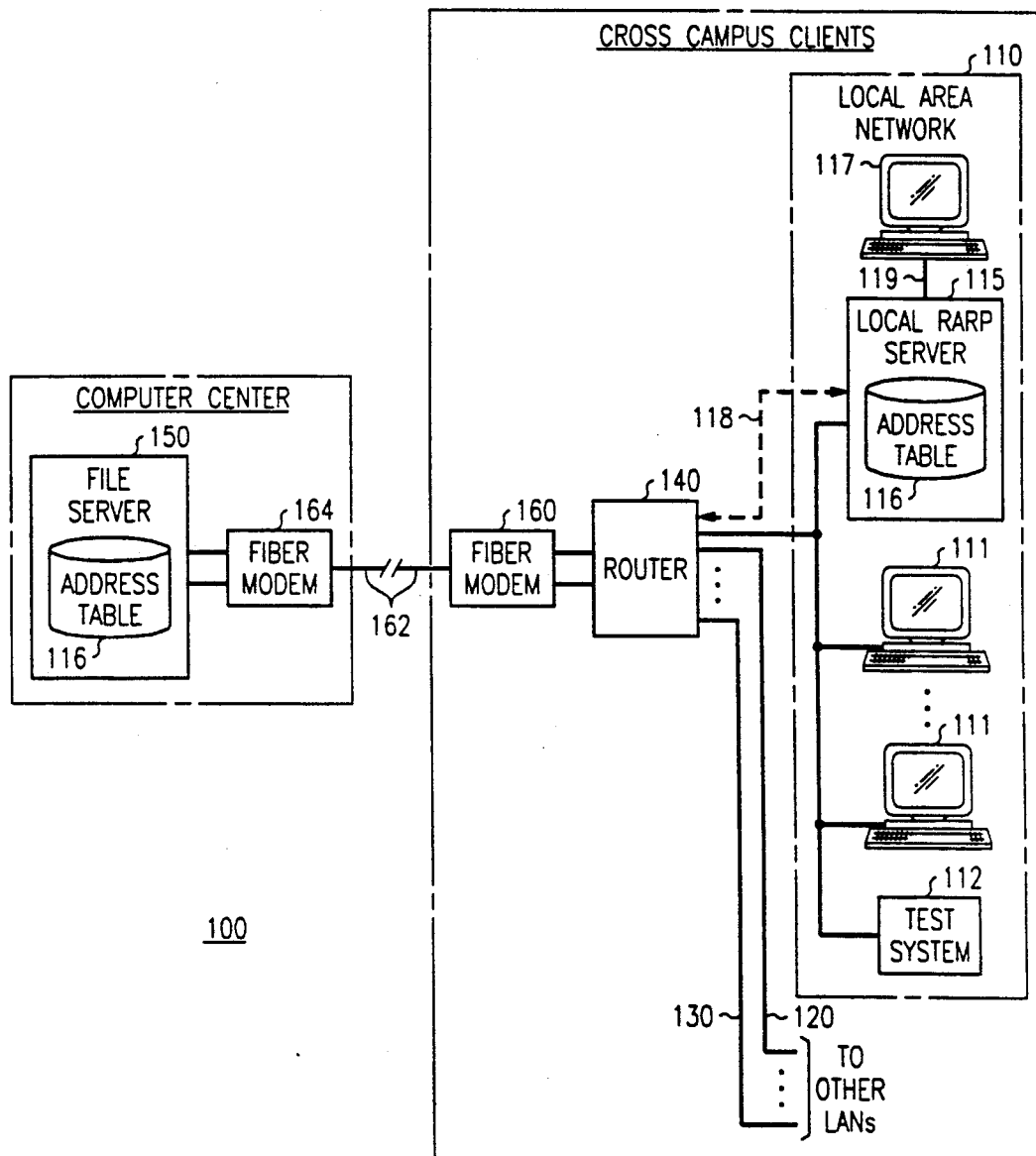
FIG. 1 is a block diagram illustrating the principles of this invention in the context of a multi-LAN network employing a router to translate protocols and distribute messages.

FIG. 1 shows a simplified block diagram illustrating a multi-LAN network 100 employing an exemplary embodiment of this invention. Multi-LAN network comprises LAN 110 and connections to a plurality of other LANs, such as 120 and 130. Nodes on each LAN on multi-LAN network 100 communicates using the INTERNET protocol, as is known in the art and fully described in D. E. Comer, Internetworking with TCP/IP, Vol. I: Principles, Protocols, and Architecture, Second Edition, Prentice Hall, 1991. Nodes on LAN 110 communicate with each other using, for example, ETHERNET (R) protocol, either version 1 or version 10 (ETHERNET is a registered trademark of the Xerox Corporation) as the physical layer protocol in the Open Systems Interconnection (OSI) 7-layer reference model established by the International Organization for Standardization, Switzerland, and described in W. Stallings, Data and Computer Communications, Third Edition, Macmillan Publishing Company, 1991. LAN 120 uses, for purposes of this illustration, STARLAN10 as is known in the art and described in AT&T Starlan Network, Hardware Technical Reference, Issue 01, Select Code: 999-120-201, available from AT&T. LAN 130 may be, for example, another ETHERNET LAN. The intra-network protocols used here are for illustrative purposes only, as this invention may be used with any physical layer LAN protocol.

All of the LANs are connected to a router 140. Router 140 receives all messages on all of the LANs connected to it and recognizes messages that are to be forwarded to another LAN. Router 140 translates the message protocol from the source LAN to the destination LAN, and transmits the message on the destination LAN. Routers such as router 140 are known in the art. In this exemplary embodiment, router 140 is manufactured by Proteon Inc., Two Technology Drive, Westborough, Mass., and described in Proteon Model p4200 Hardware Installation Manual, No: 42-040182-00, December, 1989. Additionally, router 140 accepts messages from all LANs destined for a common file server 150.

File server 150 is usually a main frame or large mini computer, as is known in the art. File server 150 provides mass storage and other resources for all of the LANs connected to router 140. File server 150 may also have print spooler and other functions that may be required by the LANs. Router 140 translates a message received for file server 150 into the proper protocol and sends the message to fiber optic modem 160, in this preferred embodiment. Fiber optic modem 160 transmits the message via fiber optic links 162 to a second fiber optic modem 164. Second fiber optic modem 164 communicates with file server 150. File server 150 responds to the request by sending a message back to the requester via fiber optic modem 164, fiber optic links 162 and fiber optic modem 160 to router 140. Router 140 translates the response to the proper protocol, and sends the message on the appropriate LAN.

It is increasingly common to have a file server located in a computer center or facility remote from the one or more of the LANs it serves. For example, a research and development facility may have a complex comprising several buildings. One or more of the buildings may be physically located remotely from the computer center where the file server is located. Also, it is increasingly common to have a file server in a first state (such as New Jersey) and have a development center in a second state (such as Illinois). In both of these cases, it is not possible to have a high quality metallic path connecting the router and the file server. Therefore, fiber optics are employed in this embodiment of this invention, but other media may be used, facilities permitting.

LAN 110 comprises, for purposes of this illustrative embodiment of this invention, a plurality of work stations 111 and a test system 112, as is common in many development laboratories. Work stations 111 comprise a terminal or small personal computer as is known in the art. Test system 112 comprises a computer, switching frame or other device that is commonly stored program controlled. In this exemplary embodiment, test system 112 is down loaded with control software from file server 150, and controlled by one or more of work stations 111.

In the prior art when a work station 111 or test system 112 came onto the LAN, it could communicate with work stations 111 and test system 112, but could not communicate with LANs 120 and 130, or with file server 150, because it did not know its Internet ID. Work stations 111 and test system 112 do not have storage facilities that are protected from power shutdown, sometimes call "diskless systems." In order to obtain an Internet ID, work stations 111 and test system 112 must send a message to file server 150, containing an address. File server 150 maintains an address table 116 with a translation of address to Internet ID. Since work stations 111 and test system 112 do not know the address of the file server, they must send broadcast messages on the network requesting their Internet ID.

Routers such as router 140 are traditionally built so that messages are routed with maximum efficiency and a minimum of congestion. Since broadcast messages cause congestion, routers such as router 140 do not pass on broadcast messages, because broadcast messages have to be sent to all LANs as well as to file server 150. Therefore, all "diskless systems" on a LAN cannot communicate from the home LAN 110 to another LAN or to the file server without going through the router to obtain an Internet ID from the file server, but the router will not forward broadcast messages.

To solve this problem, a local RARP server 115 is used according to the principles of this invention. The local RARP server (LRS) listens to the network for broadcast messages of one or more specific types, translates the address into an Internet ID, and responds to the requester. In the preferred embodiment, local RARP server 115 includes a copy of the address table 116 as kept in file server 150. Local RARP server 115 includes, in the preferred embodiment, a terminal 117 for updating address table 116 and controlling such functions as monitoring packet transfer and diagnostics. Additionally, an optional connection 118 may connect local RARP server 115 to router 140, and local RARP server 115 may control, initialize, etc. router 140.

In this exemplary embodiment, when test system 112 is powered up or otherwise initialized, as part of the boot function it will send a broadcast message on LAN 110 requesting its Internet ID. Local RARP server 115 monitors LAN 110, receives the message and determines that the message is a broadcast message. Local RARP server 115 next uses the address of the device from the broadcast message and performs a table look up to determine the Internet ID for the received address. Local RARP server 115 formats and sends a message to the requester including the Internet ID. The requester, in this case, test system 112, may then communicate with file server 150 or LANs 120 and/or 130.

Figure 2:
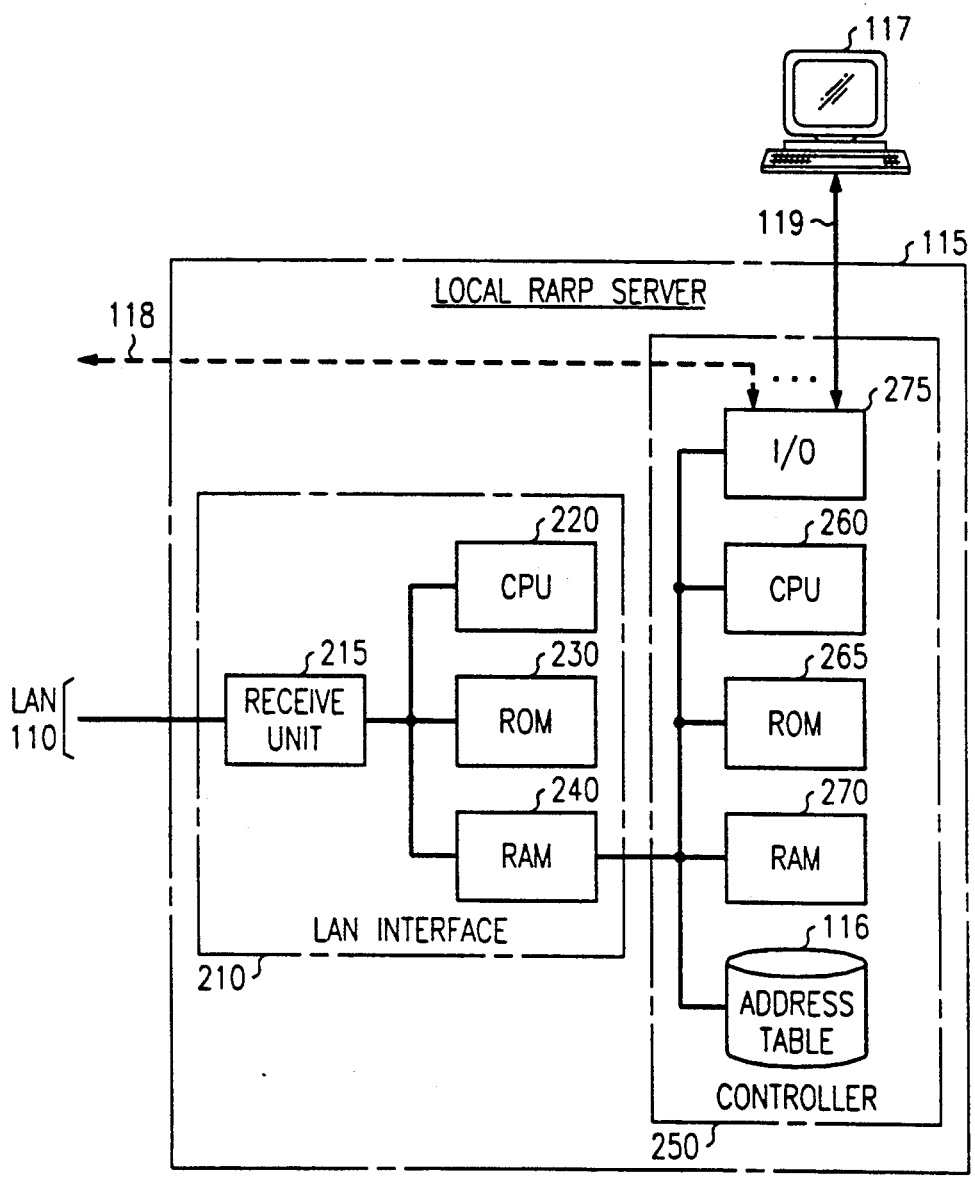
FIG. 2 is a block diagram of a local reverse address resolution protocol (RARP) server of FIG. 1 according to an exemplary embodiment of this invention.

FIG. 2 is a block diagram illustrating the main components of Local RARP server 115. Local RARP server 115 is, in this exemplary embodiment, divided into a LAN interface 210 and a controller 250. LAN interface 210 provides the physical connection to LAN 110 and receives all messages sent on LAN 110 at receive unit 215. Receive unit 215 is under the control of CPU 220 and notifies CPU 220 of any incoming message packets of a specific type. In this preferred embodiment, receive unit 215 notifies CPU 220 of the receipt of messages of type RARP.

CPU 220 is a dedicated LAN interface CPU, which is Intel 82586, available from the Intel Corp., Beaverton, Oreg., and described in Local Area Networking (LAN) Component User's Manual, Order Number: 230814-004, in the preferred embodiment. CPU 220 is a processor, under control of a program stored in ROM 230. CPU 220 causes message packets of type RARP to be moved from receive unit 215 into RAM 240. CPU 220 then causes the message packets to be moved from RAM 240 into controller 250.

Controller 250 reads the header of the RARP message, searching for the field which contains the address of the device requesting its Internet ID. Controller 250 is under control of CPU 260, which is a standard microprocessor in the preferred embodiment. CPU 260 is a processor, under control of a program stored in ROM 265. Message packets are received in controller 250 at RAM 270 after being transferred from RAM 240 of LAN interface 210 via direct memory access, as is known in the art, under control of CPU 220. CPU 260 finds the address in RAM 270, and performs a data base look up in address table 116.

Address table 116, in the preferred embodiment, comprises a 1.44 megabit "floppy" disk system, as is known in the art. Alternatively, address table 116 may comprise a large "hard" disk system, EEPROM, PROM, or some other form of occasionally writable, non-volatile memory. Address table 116 may be updated by simply removing the disk and adding or deleting addresses, or may be updated by a program running on CPU 260, which displays address-Internet ID pairs, and allows the user to add, change, and delete such pairs. Address table 116 may, for more sophisticated system, be updated by requesting a new copy of the address table from the file server.

Upon determining the Internet ID, CPU 260 formats a return message packet for the device requesting its Internet ID in RAM 270. CPU 260 then notifies CPU 220, and CPU 220 causes the message packet to be moved into RAM 240 via direct memory access. CPU 220 then causes the message packet to be moved into receive unit 215, which send the message packet out on LAN 110.

Controller 250 also comprises in the preferred embodiment an I/O controller 275, as is known in the art, for coordinating serial I/O with devices other than LAN 110. In this embodiment, I/O port 119 in I/O 275 is connected to a terminal 117 for controlling controller 250. Additionally, one I/O port 118 of I/O 275 is optionally connected to router 140, for remotely controlling router 140. Any of the I/O ports of I/O 275 may be connected to additional LANs, or other serial devices, as is known in the art.

Figure 3:
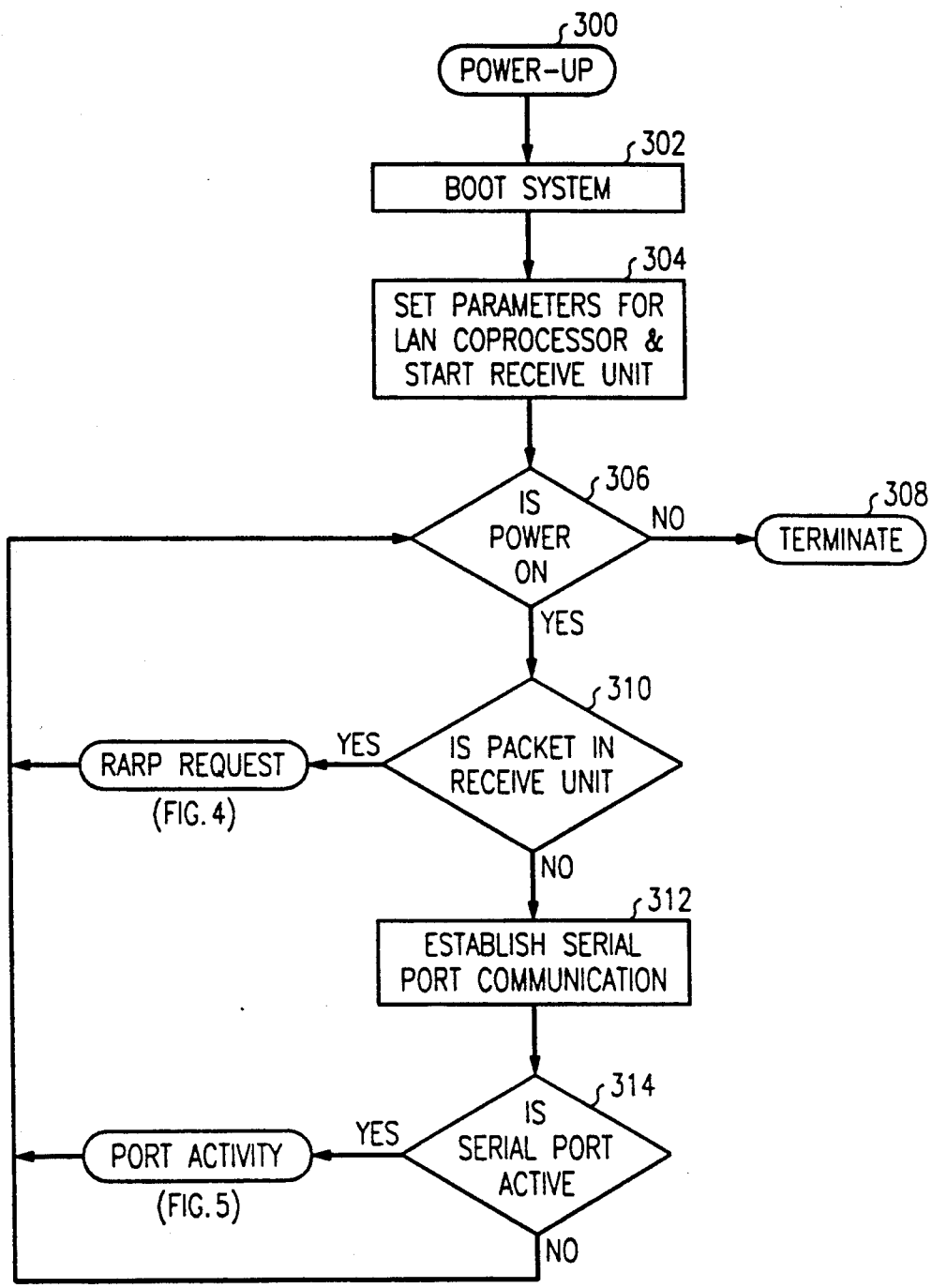

FIG. 3 is a flow chart showing the control of CPU 260 (FIG. 2) of the preferred embodiment of this invention. The local RARP server of this invention is initialized upon power-up. Therefore, processing starts in balloon 300 with power-up. Processing continues to box 302 where the system boots via ROM 265 (FIG. 2) or alternatively pumped from a card download system as is known in the art. Processing continues to box 304 where the parameters for the LAN interface 210 (CPU 220 FIG. 2) are set and the receive unit 215 (FIG. 2) is started.

Figure 4:
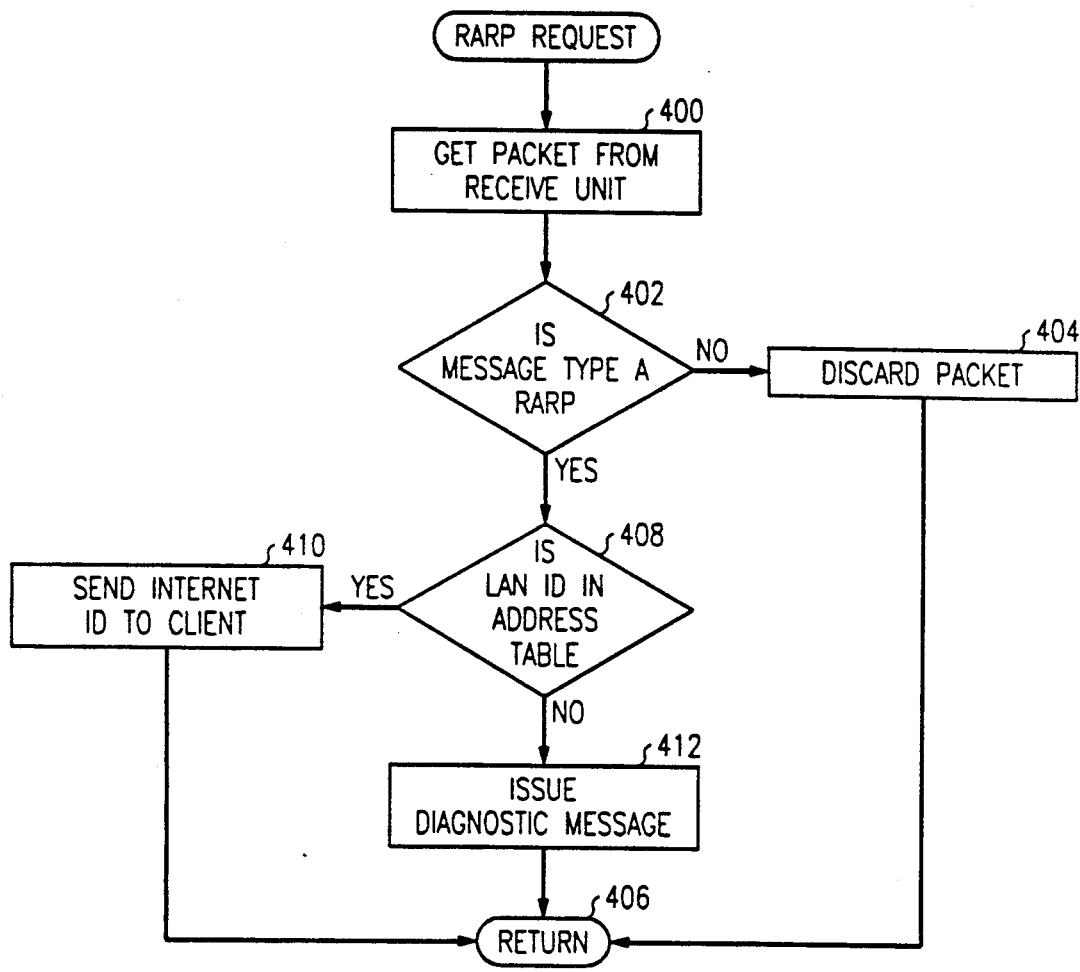

Processing continues to a large loop that remains active until the power is turned off. Processing continues to decision diamond 306 which represents a power-off. If the power goes off, processing terminates at balloon 308. If the power is on, then processing continues to decision diamond 310 where a test is made if the receive unit has received a packet. If the receive unit has received a packet, then processing continues to the process packet subroutine (FIG. 4). When the process packet subroutine returns, processing loops to the test for power decision diamond 306.

Figure 5:
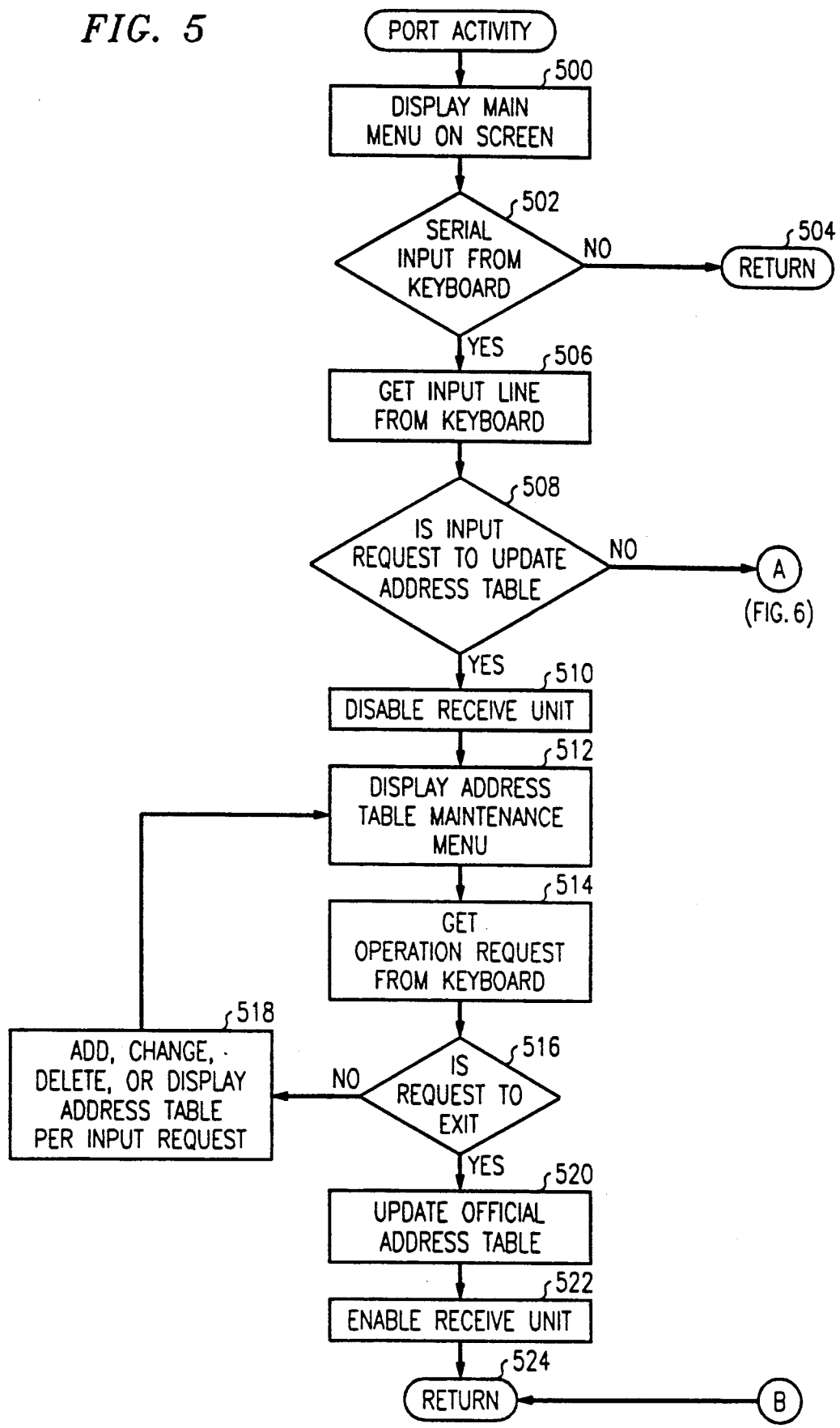

If there were no packets in the receive unit memory in decision diamond 310, then processing continues to box 312, where communication is established with the IO port 275 (FIG. 2). A determination is made in decision diamond 314 whether the serial port is active. If the serial port is not active, processing loops to decision diamond 306. If, in decision diamond 314, the serial port is active, then processing continues to the process serial port subroutine (FIG. 5). When the process serial port subroutine returns, processing loops back to decision diamond 306.

Turning now to FIG. 4, the process packet subroutine is shown. Processing starts in box 400 where the packet is moved from receive unit 215 (FIG. 2) to memory through LAN interface RAM 240 and into controller RAM 270 (FIG. 2). The receive unit memory is then freed. Processing continues to decision diamond 402 where a test is made of the message type. If the message type is not a RARP type, then the message is not a broadcast message requesting a reverse address translation. Processing thus continues to box 404 where the packet is discarded. Processing then continues to balloon 406 where the subroutine returns.

If in decision diamond 402 the message is of type RARP, then processing continues to decision diamond 408 where a test is made if the address found in the message is in the address table. In a normal case, the address will be found in the address table and the Internet ID is sent to the client in box 410. Processing then returns at balloon 406.

If in decision diamond 408 the address was not in the address table, then processing continues to box 412 where a diagnostic message is issued. The diagnostic message is, in the preferred embodiment, a message sent through the IO port 275 to the control terminal 117. However, the diagnostic message may be sent to the address found in the message packet indicating a failure or a message may be sent via LAN 110 to file server 150, and the failure logged. Processing then proceeds to the return balloon 406.

FIG. 5 shows the service serial port subroutine. Service serial port subroutine is directed towards control of a terminal such as terminal 117 (FIGS. 1 and 2). However, it would also be possible for the subroutine to control the router or accept local area network input, as is known in the art. Processing starts at at box 500 where the main menu is displayed on the screen. Processing continues to decision diamond 502 where a test is made for serial input from a keyboard. If there is no serial input from the keyboard, then processing returns in balloon 504.

If in decision diamond 502 there is serial input from a keyboard, then processing continues to box 506 where an input line is retrieved from the keyboard. Processing continues to decision diamond 508 where a test is made if the input request is to update the address table. If the input is not to update the table, then processing proceeds to connector A (FIG. 6).

If in decision diamond 508 input request is to update the table, then processing continues to box 510 where receive unit 215 (FIG. 2) is disabled. The receive unit is disabled so that no partial Internet IDs are delivered to clients on the LAN, and so that the proper Internet ID is delivered in all cases. Processing continues to box 512 where the address table maintenance menu is displayed. Processing continues to box 514 where the operation request is obtained from the keyboard. Processing continues to decision diamond 516 where a test is made if the keyboard input is a request to exit. If it is not, then processing continues to box 518 where the address table 116 (FIG. 2) is updated with additions, changes, deletions, or a display of the address table entries is performed. Processing continues from box 518 back to box 512 where the address table maintenance menu is displayed.

If in decision diamond 516 that the input from the keyboard was determined to be a request to exit, then processing continues to box 520 where address table 116 (FIG. 2) is updated. Processing then continues to box 522 where receive unit 215 (FIG. 2) is enabled so that Internet IDs may be obtained and processing returns in balloon 524.

Turning now to FIG. 6, if in decision diamond 508 the input is determined not to be a request to update the address table, then processing proceeds through connector A to box 526 where the normal mode menu is displayed. Processing continues to decision diamond 528 where input is retrieved from the keyboard and the operation mode is selected. Processing may continue in box 530 where all packets coming into the receive unit are monitored. This informs the maintenance person of the packet traffic on local area network 110. Alternatively, in box 532 a diagnostic packet may be sent across LAN 110 to determine the functionality of both the LAN and the local RARP server. Also, in box 534, communication may be established through IO 275 (FIG. 2) to router 140 (FIG. 1). After each step in this process, processing continues through connector A where packets are checked for RARP requests. This gets high priority to handling of packets, which is the primary functionality of the local RARP server. Processing then returns back to box 526.

Also, as a result of the select operation mode type decision diamond 528, a selection would be made to exit the normal mode in box 536. In this case, processing continues to the return balloon 524.

It is to be understood that the above-described embodiment is merely an illustrative principle of the invention and that many variations may be devised by those skilled in the art, without departing from the scope of the invention. For example, local RARP server could be used to monitor for unauthorized access to a local area network. Local RARP server could also be used as a monitor for counting and reporting on unusual message types being distributed on LAN 110. Additionally, if the Internet ID is not found in the address table, a new copy of the address table may be requested from the file server. If the Internet ID is still not found in the new copy of the address table, then the local RARP server could log the failed request to the file server. It is, therefore, intended that such variations be included within the scope of the claims.

We claim:

1. A method for providing an internetwork identification to a client on a local area network (LAN), said LAN client comprising a node on said LAN that does not have a writable, non-volatile memory for storing said internetwork identification, said LAN being connected to other LANs by a router, said router being configured to not pass broadcast messages from said LAN to said other LANs, said method comprising:
   receiving on said LAN a broadcast message from said LAN client during initialization of said LAN client, said broadcast message requesting an internetwork identification for use in subsequent communication with nodes on said other LANs and specifying an address of said LAN client;
   translating said address of said LAN client into said internetwork identification; and
   transmitting a message on said LAN to said LAN client containing said internetwork identification, whereby said internetwork identification of said LAN client is obtained without said router passing said broadcast message to other LANs.

2. A method in accordance with claim 1 wherein said translating comprises performing a table look up in an address table where said LAN address is paired with its corresponding internetwork identification.

3. A method in accordance with claim 2 further comprising:
   if said LAN address is not paired with a corresponding internetwork identification in said address table, transmitting a diagnostic message to said LAN client.

4. A method in accordance with claim 2 further comprising:
   if said LAN address is not paired with a corresponding internetwork identification in said address table, transmitting a request to a file server for an update of said address table.

5. An apparatus for use in a LAN, said LAN comprising one or more clients that do not have writable, non-volatile memory for storing an internetwork identification, said client relying on a node on one other LAN for data storage, said LAN being connected by a router to other LANs, including said one other LAN, said router being configured to not pass broadcast messages from said LAN to said other LANs, said apparatus providing an internetwork identification in response to a broadcast message request for internetwork identification at initialization of one of said client, said broadcast message including said one client's address, said apparatus comprising:
   means for receiving said broadcast message from said LAN; and
   means, coupled to said means for receiving, for providing a translation of said address of said one client to an internetwork identification responsive to determining that said received message is a broadcast message request for internetwork identification.

6. An apparatus in accordance with claim 5 wherein said translation means comprises first means for determining that said received message comprises a broadcast message request for an internetwork identification, and second means for receiving said address and providing said internetwork identification, said first means coupled to said second means and said second means responsive to said request by said first means for providing said internetwork identification.

7. An apparatus in accordance with claim 6 wherein said second means comprises a disk system.

8. An apparatus in accordance with claim 6 wherein said second means comprises a writable, nonvolatile electronic device.

9. An apparatus in accordance with claim 6 further comprising
means for interfacing said first means to a terminal.

10. An apparatus in accordance with claim 6 further comprising
means for updating said second means.

11. An apparatus in accordance with claim 10 wherein said updating means comprises
means for sending an update request to a file server, and
means responsive to a message from said file server for updating said second means.

12. On a LAN,
a terminal without storage of an internetwork identification necessary to permit communication to and from it outside said LAN;
storing means on said LAN for storing said internetwork identification unique to said terminal; and
translating means for monitoring broadcast messages on said LAN from said terminal and for responding to selected broadcast messages from said terminal by delivering a message to said terminal comprising said internetwork identification from said storage means.

* * * * *